United States Patent

Schafer et al.

[15] 3,648,820
[45] Mar. 14, 1972

[54] APPARATUS FOR FEEDING CHOCOLATE BARS AND THE LIKE TO A PACKING MACHINE

[72] Inventors: Fred Schafer, Rodenbach; Gerhard Puderbach, Neuwied, both of Germany

[73] Assignee: Winkler & Dunnebier Maschinenfabrik und Eisengiesserei KG, Neuwied on Rhine, Germany

[22] Filed: Jan. 29, 1970

[21] Appl. No.: 6,766

[30] Foreign Application Priority Data

Feb. 8, 1969 Germany ..................... P 19 06 366.1

[52] U.S. Cl. .................................. 198/21, 198/81, 198/102
[51] Int. Cl. ........................................................ B65g 47/51
[58] Field of Search ..................... 198/82, 32, 34, 21, 31 AA, 198/31 AB, 31 AC, 81, 83

[56] References Cited

UNITED STATES PATENTS

| | | | |
|---|---|---|---|
| 1,867,389 | 7/1932 | Sylvester | 198/31 AA |
| 3,150,761 | 9/1964 | Pinault et al. | 198/31 AB |

FOREIGN PATENTS OR APPLICATIONS

| | | | |
|---|---|---|---|
| 426,690 | 6/1967 | Switzerland | 198/34 |

*Primary Examiner*—Joseph Wegbreit
*Assistant Examiner*—H. S. Lane
*Attorney*—Richards & Geier

[57] ABSTRACT

An apparatus feeds bars or slabs of chocolate or the like in longitudinal rows from a bar making machine to a packing machine by means of a longitudinal conveyor belt which receives the bars in transverse rows and a transverse conveyor belt which takes over the bars in longitudinal rows. The invention is particularly characterized in that the delivery end of the uniformly running longitudinal conveyor belt extends over the width of the uniformly running lower transverse conveyor belt and can be pivoted downwardly by an angle of about 15°. The movement of each arriving transverse row of bars is limited by a stop. The delivery end of the longitudinal conveyor belt can be automatically displaced to provide a tilting of the transverse row of bars upon the running transverse conveyor belt.

5 Claims, 5 Drawing Figures

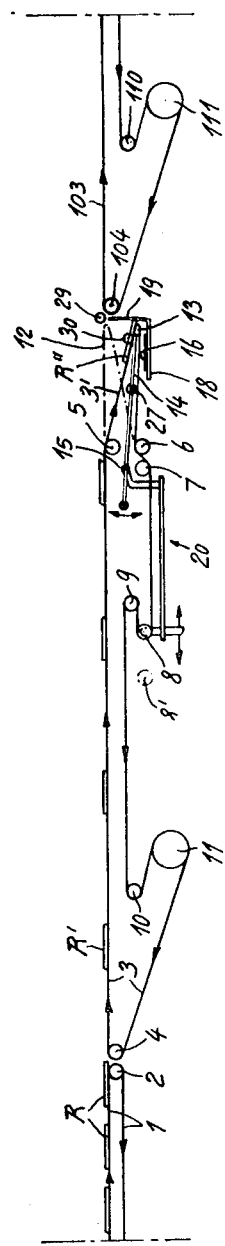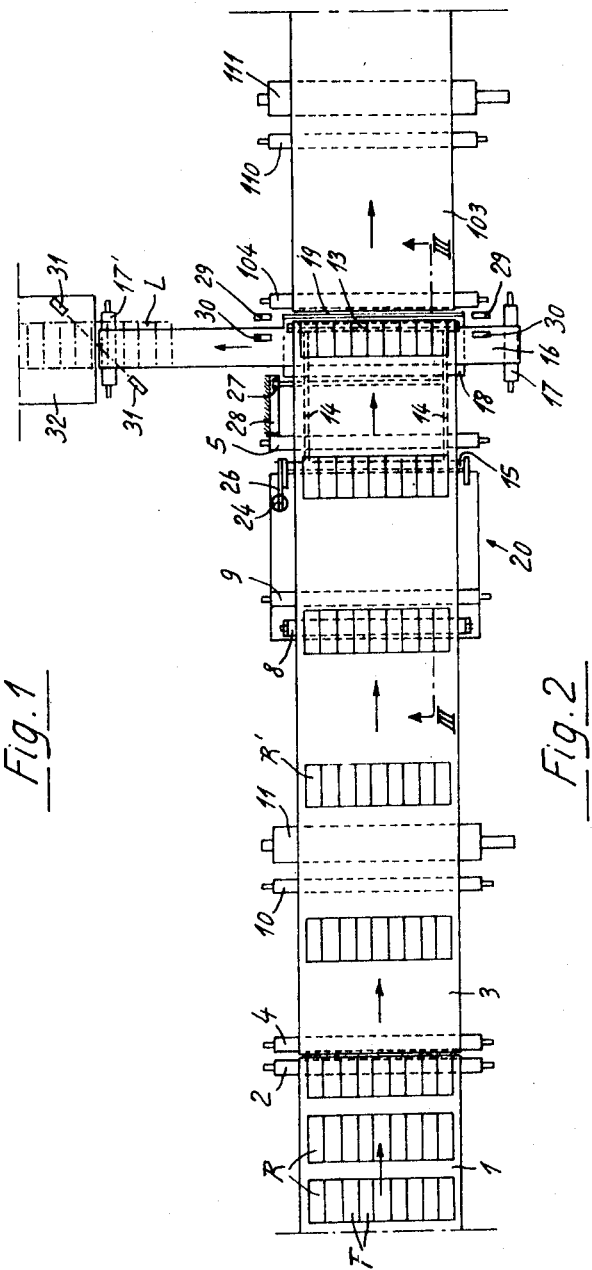

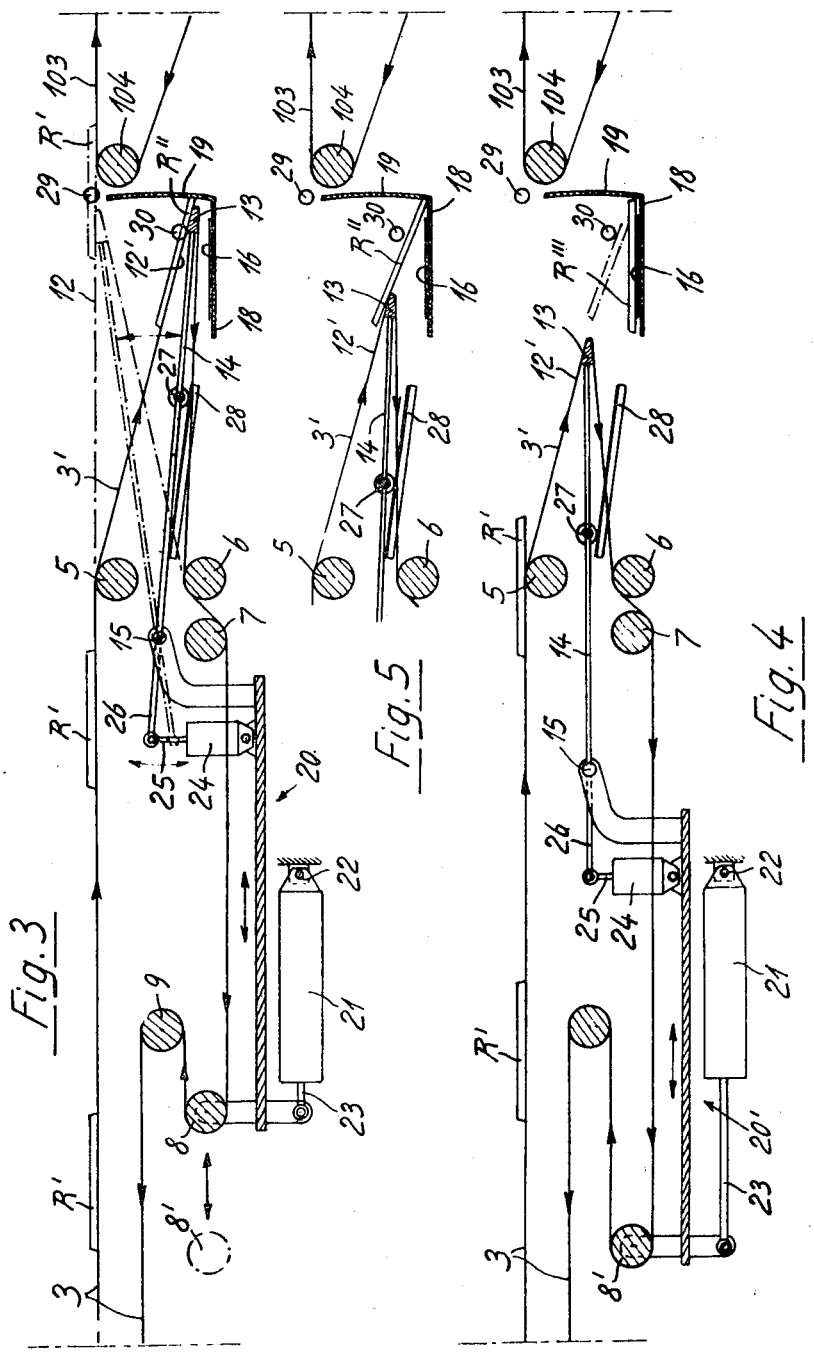

APPARATUS FOR FEEDING CHOCOLATE BARS AND THE LIKE TO A PACKING MACHINE

This invention relates to an apparatus for feeding chocolate bars, slabs or the like from a chocolate-bar-making machine to a packing machine.

The invention refers more particularly to an apparatus disposed at the discharge end of a machine for making individual bars, slabs or elongated hollow products out of chocolate or the like, the apparatus feeding the chocolate bars or slabs to a packing machine.

In an apparatus of this type, a longitudinal conveyor belt which takes over the bars arriving in transverse rows from the bar-making machine, the distance between the transverse rows being as a rule increased, is followed by a transverse conveyor belt which takes over in longitudinal rows the bars arriving in the form of transverse rows on the longitudinal conveyor belt, and feeds such longitudinal rows to the packing machine.

To make sure that the products produced can be packed even if one packing machine fails, as a rule at least three packing machines are connected to each bar-making machine and suitable number of apparatuses is provided for feeding the bars as required to one packing machine or the other, the longitudinal conveyor belts of the apparatuses being preferably aligned with one another, each longitudinal conveyor belt being followed by a transverse conveyor belt extending to a packing machine.

Existing apparatuses of this type have aligned longitudinal conveyor belts whereby the delivery end of each longitudinal conveyor belt is followed by a transverse conveyor belt disposed above or below the effective plane of the longitudinal conveyor belt and extending to the particular packing machine. To transfer a row of bars to a transverse conveyor belt, the delivery end of the particular longitudinal conveyor belt is automatically moved into the raised position of the transverse conveyor belt, and the transverse row of bars is, when the longitudinal conveyor belt is stationary, automatically pushed by a pusher from the longitudinal conveyor belt onto the transverse conveyor belt, which is also stationary at that moment. If the transverse conveyor belt and the associated packing machine are unable to take any bars—and this can be automatically detected, for instance, by sensers or photoelectric cells—the transverse rows of bars continue to run from a longitudinal conveyor belt onto the next longitudinal conveyor belt until they can be pushed onto a free transverse conveyor belt.

These prior art apparatuses have two disadvantages. In the first place, the longitudinal and transverse conveyor belts must be operated intermittently and be stationary while the bars are being pushed onto the transverse conveyor belt, so that the bars are not skewed thereon. In the second place, the bars can be easily damaged both by the pusher engaging therewith, and also by sliding on the intermittently moving conveyor belts.

An object of the present invention is to improve existing constructions through the provision of an apparatus which will not have the above drawbacks.

Other objects of the present invention will become apparent in the course of the following specification.

In the accomplishment of the objectives of the present invention, it was found desirable to provide an apparatus having a longitudinal conveyor belt which takes over the bars arriving in transverse rows from a bar-making machine, the distance between the transverse rows being increased if necessary, and a transverse conveyor belt which takes over the bars in longitudinal rows from the longitudinal conveyor belt, wherein the delivery end of the uniformly running longitudinal conveyor belt extends over the width of the uniformly running transverse conveyor belt disposed at a lower level and can be pivoted downwards through an angle of about 15°. A plate or bearing and a stop are provided to limit the travel of each transverse row of bars arriving through the downwardly pivoted delivery end of the longitudinal conveyor belt. The delivery end of the longitudinal conveyor belt can be automatically displaced, substantially parallel with the downwardly inclined run of the longitudinal conveyor belt and against the conveying direction of the longitudinal conveyor belt, so that the transverse row of bars can tilt downwards around its front edge resting against the bearing onto the running transverse conveyor belt.

As above stated, each of a number of packing machines following bar-making machines has one of the apparatuses according to the invention, and the longitudinal conveyor belts of the apparatuses are conveniently aligned with one another in succession.

The invention will appear more clearly from the following detailed description when taken in connection with the accompanying drawings showing by way of example only, a preferred embodiment of the inventive idea.

In the drawings:

FIG. 1 is a diagrammatic side elevation of the apparatus;

FIG. 2 is a diagrammatic plan view of the apparatus;

FIG. 3 is a diagrammatic longitudinal section through the delivery end of the apparatus in the front end position, on an enlarged scale, and taken along the line III—III in FIG. 2;

FIG. 4 is a longitudinal section corresponding to FIG. 3, but showing the rear end position and FIG. 5 shows a central position of the delivery end as illustrated in FIG. 3.

FIGS. 1 and 2 show a conveyor belt 1 which runs over a deflecting roller 2 at the delivery end of a bar-making machine (not shown) and conveys transverse rows R of chocolate bars or slabs T disposed one after the other at a slight distance from one another in the direction indicated by the arrow. The conveyor belt 1 is followed by a longitudinal conveyor belt 3 which runs in the direction indicated by the arrow over deflecting rollers 4–10 and the drive roller 11 and is stretched at its delivery end 12 over a deflecting edge 13. The longitudinal conveyor belt 3 has a substantially higher adjustable speed than the conveyor belt 1, so that transverse rows R' of bars taken over from the conveyor belt 1 keep a distance from one another on the longitudinal conveyor belt 3 of about three or more bar lengths. The top run of the longitudinal conveyor belt 3 bearing the transverse rows R' is borne on guides (not shown) between the deflecting rollers 4, 5.

As can be seen most clearly from FIGS. 3 and 4, the deflecting edge 13 can be so pivoted on arms 14 around the pivoting axis 15 in the manner to be described in greater detail hereinafter, that the delivery end of the longitudinal conveyor belt 3 can have either a top end position 12 or a bottom end position 12'.

Disposed below the delivery end of the longitudinal conveyor belt 3 is a transverse conveyor belt 16 which runs in the direction indicated by the arrow over deflecting rollers 17, 17' to a first packing machine (not shown). In the zone of the longitudinal conveyor belt 3, the transverse conveyor belt 16 is borne by a plate 18 on which a stop 19 is located at a certain distance from the lateral edge of the transverse conveyor belt 16. The transverse row R'' of slabs arrive on the delivery end of the longitudinal conveyor belt 3 in the bottom end position 12' abutting the stop 19.

As can be seen most clearly from FIGS. 3 and 4, the pivoting axis 15 of the deflecting edge 13 and the deflecting roller 8 are mounted on a carriage 20 which can be displaced, in the direction indicated by the double arrows, parallel with the top run of the longitudinal conveyor belt 3 in or against the direction of movement thereof, namely into a front end position (FIG. 3) and a rear end position 20' (FIG. 4). The displacement is automatic, namely, it is carried out by a hydraulic cylinder 21 whose end 22 is secured to the apparatus frame and whose piston rod 23 engages with the carriage. Carriage travel can be adjusted in accordance with the length of the bars to be conveyed.

To pivot the deflecting edge 13 and therefore the delivery end of the longitudinal conveyor belt 3 into its top end position or its bottom end position 12', a hydraulic cylinder 24 is provided whose end is secured to the carriage 20 and whose piston rod 25 engages through a lever 26 with the pivot 15 of the deflecting edge 13. The end positions of the delivery end 12 can be adjusted. Pivoting into one of these two end positions is automatically controlled in the manner to be described hereinafter.

Disposed on the arms 14 retaining the deflecting edge 13 is a roller 27 which extends laterally beyond the longitudinal conveyor belt 3 and bears against a stationary slideway 28 when the delivery end of the longitudinal conveyor belt 3 is in the bottom end position 12'. The slideway 28 is so shaped that when the carriage 20 is moved from its front end position into its rear end position 20', the deflecting edge 13 moves along the downwardly inclined run 3' of the longitudinal conveyor belt, without altering its angle of inclination (FIGS. 4 and 5).

The stop 19 is followed by a second apparatus with a longitudinal conveyor belt and associated transverse conveyor belt, which extend to a second packing machine. The second apparatus is completely identical with the first one and its parts (when shown) have like reference numerals to those of the first apparatus, with the numeral 100 added. With three or more packing machines, a third or fourth apparatus having longitudinal and transverse conveyor belts can follow.

As shown in FIG. 3, the top edge of the stop 19 is so low that any transverse row of bars R' arriving on the delivery end of the first longitudinal conveyor 3 disposed in the top end position 12 can be taken over unimpeded by the second longitudinal conveyor belt 103. A photoelectric cell 29 is so located above the stop 19 parallel with its top edge that the ray of the photoelectric cell is interrupted by a transverse row of bars disposed above the stop 19. A photoelectric cell 30 is so located above the delivery end of the longitudinal conveyor belt 3 in its bottom end position 12', that the ray of the photoelectric cell is interrupted by a transverse row R'' of bars at that place. A third photoelectric cell 31 (FIG. 2), which is inoperative during the normal passage of the longitudinal row L of bars, is so disposed above the inlet end of a packing machine 32 and the delivery end of the transverse conveyor belt 16, that the ray of the photoelectric cell 31 is interrupted when the packing machine is unable to take any further bars for some reason or other. Photoelectric cells are associated in a similar manner with the following longitudinal conveyor belt 103 and transverse conveyor belt 116 of the second apparatus and any following conveyor belts.

The operation of the described apparatus is as follows: The longitudinal conveyor belt 3 and the following longitudinal conveyor belt 103 and any other longitudinal conveyor belts operate continuously at uniform speed, and so does the transverse conveyor belt 16, the transverse conveyor belt 116 and any other transverse conveyor belts. The longitudinal conveyor belt 3 conveys transverse rows R' of bars taken over from conveyor belt 1, with the rows a large distance apart. Let it be assumed that the packing machine connected to the transverse conveyor belt 16 cannot accept further bars and that the ray off the photoelectric cell 31 is therefore interrupted. The interruption of the ray of the photoelectric cell 31 automatically causes a solenoid (not shown) to actuate the cylinder 24 so that it pivots the delivery end of the longitudinal conveyor belt 3 from its bottom end position 12' into its top end position 12. The transverse rows R' are conveyed from the first longitudinal conveyor belt 3 to the second longitudinal conveyor belt 103. As soon as the ray of the photoelectric cell 31 is no longer interrupted, nor is the ray of the photoelectric cell 29 interrupted by slabs passing from the longitudinal conveyor belt 3 onto the longitudinal conveyor belt 103, these two photoelectric cells so control the cylinder 24 by means of a solenoid (not shown) that the cylinder 24 pivots the delivery end of the longitudinal conveyor belt 3 into its bottom end position 12', so that the roller 27 bears against the slideway 28. The photoelectric cell 30 comes into operation only when the delivery end of the conveyor belt 3 has reached its bottom end position 12'.

As soon as a transverse row of bars R'' interrupts the ray of the photoelectric cells 30, such interruption automatically controls the cylinder 21 by means of a solenoid (not shown), and the carriage 20 moves out of its front end position into its rear end position 20'. The simultaneous displacement of the deflecting roller 8 into the position 8' pulls the longitudinal conveyor belt by its delivery end around the receding deflecting edge 13, without changing the angle of inclination of the portion 3' of the conveyor belt between the deflecting roller 5 and the deflecting edge 13. Consequently, the transverse row R'' of bars first engages by its front edge against the stop 19 on the plate 18, without touching the running transverse conveyor belt (FIG. 5) and thereafter tilts down onto the transverse conveyor belt 16 (FIG. 4) which feeds the bars in a longitudinal row L to the packing machine. A limit switch actuated by the movement of the carriage into its position 20' controls the cylinder 21 by a solenoid (not shown) to move back the carriage immediately into its front end position 20. The cycle is repeated until the photoelectric cell 31 initiates an upward pivoting of the deflecting edge 13 into the top end position 12 of the delivery end of the longitudinal conveyor belt 3. To prevent the carriage from being moved when the delivery end of the conveyor belt 3 passes through the photoelectric cell 30, the latter remains inoperative as long as the ray of the photoelectric cell 31 is interrupted. The delivery end of the first longitudinal conveyor belt 3 therefore remains for that length of time in its top end position 12 and passes on the arriving transverse rows R' of bars to the second longitudinal conveyor belt 103 until the associated packing machine 32 can again accept bars and the photoelectric cells 29, 21 cooperate in the manner hereinbefore described to pivot the delivery end of the longitudinal conveyor belt 3 up into its top end position. The delivery ends of the second longitudinal conveyor belt 103 and any further longitudinal conveyor belts are automatically controlled by photoelectric cells in the same manner, depending as to whether the associated packing machines can accept bars.

The control of the movements of the delivery end of the longitudinal conveyor belt by photoelectric cells, hydraulic or pneumatic valves, solenoids and cylinders is only given as an example of one embodiment of the apparatus according to the present invention, and does not constitute a limitation thereof. The movements of the delivery end of the longitudinal conveyor belt can be controlled by other suitable means, the use thereof being covered by the present invention.

The advantages of the apparatus according to the invention consist in the provision of continuously running longitudinal and transverse conveyor belts and the elimination of a mechanical pusher, controlled in the rhythm of the arrival of transverse rows for transferring the bars from the longitudinal conveyor belt onto the transverse conveyor belt. Since an intermittently operating conveyor belt has about twice the maximum speed for any particular conveying speed, the transverse rows of bars can easily lose direction, due to repeated acceleration and deceleration. Either an extra stop which can be rhythmically moved upwards and downwards must be provided on the intermittently operating longitudinal conveyor belt to align the transverse rows, or there is a risk that the bars will get under the pusher and be damaged. These disadvantages are eliminated by the continuously operating conveyor belts of the apparatus according to the invention. The stationary stop 19, abutted by each transverse row of bars when they are transferred to the transverse conveyor belt, precisely aligns such transverse row without extra control elements.

We claim:

1. In an apparatus for feeding longitudinal rows of chocolate bars and the like from a bar making machine to bar packing machines, a uniformly running longitudinal conveyor belt, having an individual delivery end, another longitudinal conveyor belt constituting a continuation of the first-mentioned conveyor belt and having a delivery end, a uniformly running transverse conveyor belt extending toward a packing machine, the first-mentioned delivery end extending over the width of the first-mentioned transverse conveyor belt, the second-mentioned delivery end extending over the width of said other transverse conveyor belt which extends toward another packing machine, means swinging the first-mentioned delivery end downwardly into an inclined position extending toward the first-mentioned conveyor belt and for automatically swinging the first-mentioned delivery end from said inclined position to a top position wherein it is alined with the rest of the first-mentioned conveyor belt, a stop located adjacent the edge of the first-mentioned transverse conveyor belt which is away from the first-mentioned longitudinal conveyor belt for engaging bars sliding downwardly upon the first-mentioned inclined delivery end, and means withdrawing the first-mentioned delivery end in a direction parallel to itself from said stop to cause bars engaging said stop to drop upon the first-mentioned transverse conveyor belt and comprising a deflecting edge engaging a bent portion of the first-mentioned longitudinal conveyor belt at the first-mentioned delivery end, an arm carrying said deflecting edge, a pivoting axis carrying said arm, a roller spaced from said axis and engaging a curved portion of the first-mentioned longitudinal conveyor belt, said roller pressing said portion of the first-mentioned longitudinal conveyor against said deflecting edge, and means supporting said pivoting axis and said roller and moving them jointly into front and rear end positions.

2. An apparatus in accordance with claim 1, wherein the first-mentioned delivery end swings downwardly to the extent of about 15°.

3. An apparatus in accordance with claim 1, wherein the last-mentioned means consist of an automatically sliding carriage.

4. An apparatus in accordance with claim 1 wherein the last-mentioned means comprise a hydraulic or pneumatic cylinder moving jointly said pivoting axis and said roller and a separate hydraulic or pneumatic cylinder actuating said arm.

5. An apparatus in accordance with claim 4, further comprising photoelectric cell means actuating said cylinders depending upon absence or presence of bars upon said conveyor belts.

* * * * *